United States Patent [19]
Nakamura

[11] Patent Number: 4,930,067
[45] Date of Patent: May 29, 1990

[54] MICROCOMPUTER HAVING A HIGH-SPEED OPERATION MODE AND A LOW-SPEED OPERATION MODE WITH INTERMITTENT DISABLING OF SENSE AMPLIFIERS

[75] Inventor: Michiya Nakamura, Tokyo, Japan
[73] Assignee: NEC Corporation, Tokyo, Japan
[21] Appl. No.: 298,436
[22] Filed: Jan. 18, 1989

Related U.S. Application Data
[62] Division of Ser. No. 4,927, Jan. 20, 1987.

[30] Foreign Application Priority Data
Jan. 20, 1986 [JP] Japan ................................. 61-10419
[51] Int. Cl.⁵ .......................... G06F 3/00; G06F 9/00; G06F 13/38; G06F 15/16
[52] U.S. Cl. ................................. 364/200; 364/254.8; 364/260; 364/273.1; 364/273.5; 365/189.01
[58] Field of Search ... 364/900 MS File, 200 MS File; 365/189

[56] References Cited
U.S. PATENT DOCUMENTS

| | | | |
|---|---|---|---|
| 4,470,109 | 9/1984 | McNally | 364/200 |
| 4,594,690 | 6/1986 | Meyers et al. | 365/230 |
| 4,715,017 | 12/1987 | Iwahashi | 365/239 |
| 4,727,491 | 2/1988 | Culley | 364/200 |
| 4,807,194 | 2/1989 | Yamada et al. | 365/207 |
| 4,807,195 | 2/1989 | Busch et al. | 365/207 |

Primary Examiner—Archie E. Williams, Jr.
Assistant Examiner—Ayni Mohamed
Attorney, Agent, or Firm—Sughrue, Mion, Zinn, MacPeak & Seas

[57] ABSTRACT

A microcomputer has an instruction memory and a high-speed sense amplifier and can selectively operate according to a high-speed operation mode and to a low-speed operation mode. The high-speed sense amplifier is activated in a full time or with a large duty rate in the high-speed operation mode and is activated with a short duty rate in the low-speed operation mode.

2 Claims, 6 Drawing Sheets

4,930,067

MICROCOMPUTER HAVING A HIGH-SPEED OPERATION MODE AND A LOW-SPEED OPERATION MODE WITH INTERMITTENT DISABLING OF SENSE AMPLIFIERS

This is a division of Ser. No. 004,927, filed Jan. 20, 1987.

BACKGROUND OF THE INVENTION

The present invention relates to a microcomputer having a high-speed operation mode and a low-speed operation mode, and particularly to a microcomputer having a high-speed sense amplifier to read an instruction out of an instruction memory.

In general, a high frequency oscillator is used to apply a high frequency clock to a microcomputer in the high-speed operation mode, while a low -frequency oscillator is used in the low-speed operation mode. In order to increase an operation speed of a microcomputer, not only an instruction execution speed but also an instruction reading speed must be increased. To increase the instruction reading speed, a high-speed sense amplifier, such as a current mirror type sense amplifier, will be required as a memory reading circuit. Since the sense amplifier of this type is driven by a large amount of current, a large amount of power is consumed.

In the high-speed operation mode, an instruction reading cycle becomes short because the instruction execution speed is increased and because the high frequency clock is used. However, an instruction reading period can not be shortened less than a period that will be determined by characteristics of the sense amplifier and a memory to make sure an instruction fetch into a central processing unit (CPU). Thus, it will be required in the high-speed operation mode to use such a sense amplifier that is activated in a full time or with a large duty rate.

On the other hand, when the low frequency oscillator is connected to the microcomputer in the low-speed operation mode, a low power consumption is required. In this case, a low frequency clock is applied to the microcomputer. However, a large amount of power is consumed by the above sense amplifier because it is activated with the same duty rate as that in the high-speed operation mode. To avoid the power consumption of the sense amplifier a low-power sense amplifier is required. However, since a microcomputer having the low-power sense amplifier has to be newly developed, a long development term and a design change are necessary.

SUMMARY OF THE INVENTION

It is an object of the present invention is to provide a microcomputer having a high-speed operation mode and a low-speed operation mode with a low power consumption.

It is another object of the present invention is to provide a microcomputer having a high-speed sense amplifier which can be activated with a low power in a low-speed operation mode.

A microcomputer of the present invention has a sense amplifier and a circuit coupled to the sense amplifier to generate an enable signal to activate the sense amplifier and to apply the enable signal to the sense amplifier. The circuit generates a first enable signal which activates the sense amplifier in a full time or with a large duty rate during a high-speed operation mode, and generates a second enable signal with a short duty rate during a low-speed operation mode. The first and second enable signals are selectively generated according to a mode designating signal.

DESCRIPTION OF THE PREFERRED EMBODIMENTS

A detailed description of the present invention will be given by the reference of the accompanied drawings.

Figure 1:
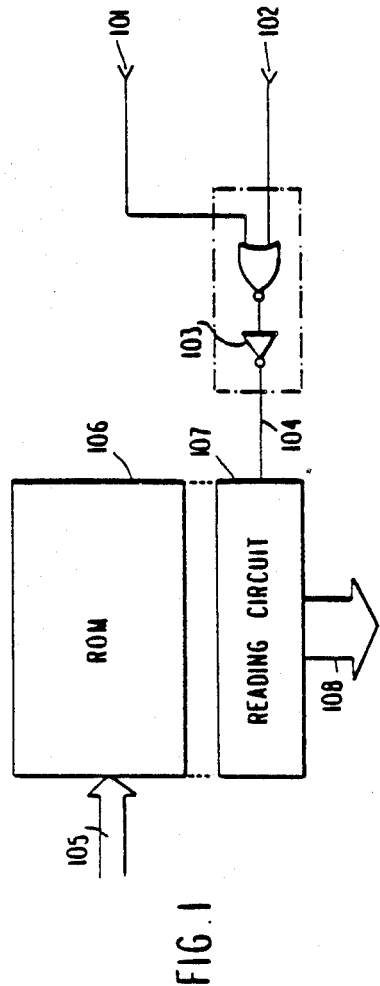
FIG. 1 illustrates a block diagram of one embodiment of the present invention.

FIG. 1 illustrates a block diagram of a memory 106 and a reading circuit 107 in a microcomputer. Each of instruction cycles of the microcomputer consists of $\phi 1$, $\phi 2$, $\phi 3$ and $\phi 4$ states. An instruction in a read only memory (ROM) 106 is read thereof in the $\phi 4$ state of a previous instruction cycle and the $\phi 1$ state of a succeeding instruction cycle and is executed in the $\phi 2$ to $\phi 4$ state in the above succeeding instruction cycle. The reading circuit has a high-speed sense amplifier 107. An enable signal 104 is used in the present invention to activate the sense amplifier 107. The enable signal 104 is generated from an enable signal generating circuit 103 which receives a mode designating signal 101 and a reading control signal 102. The mode designating signal becomes "H" under a high-speed operation mode and becomes "L" under a low-speed operation mode. The reading control signal 102 becomes "H" in the $\phi 4$ and $\phi 1$ states and becomes "L" in the $\phi 2$ and $\phi 3$ states. Each of the states $\phi 1$ to $\phi 4$ is determined by one cycle of a clock applied to the microcomputer.

Figure 2:
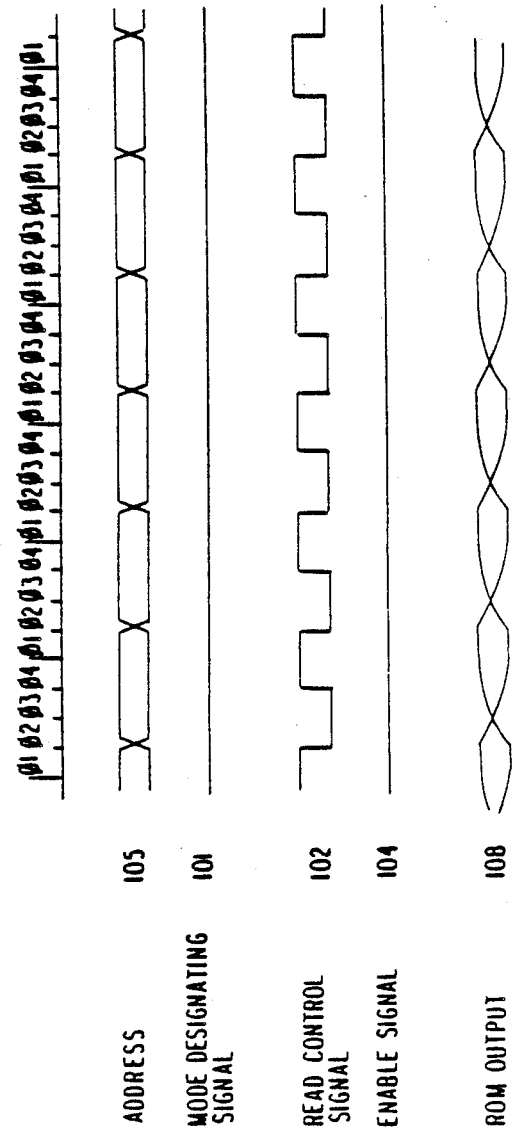
FIG. 2 illustrates a timing chart of FIG. 1 in a high-speed operation mode.

In the high-speed operation mode shown in FIG. 2, the mode designating signal 101 becomes "H". An address 105 is applied to the ROM 106 from the $\phi 2$ state in a previous cycle until the $\phi 1$ state in a succeeding cycle according to an instruction prefetch architecture. In this mode the enable signal 104 is always "H" in spite of the reading control signal 102. Consequently, the sense amplifier 107 is always activated, so that an instruction 108 designated by the corresponding address 105 is read out of the ROM 106 via the sense amplifier 107. Since the enable signal 104 is fixed at "H" during the high-speed operation mode, each of instructions corresponding to addresses is sequentially read out of the ROM 106 and is sent to an instruction decoder in a CPU (not shown).

Figure 3:
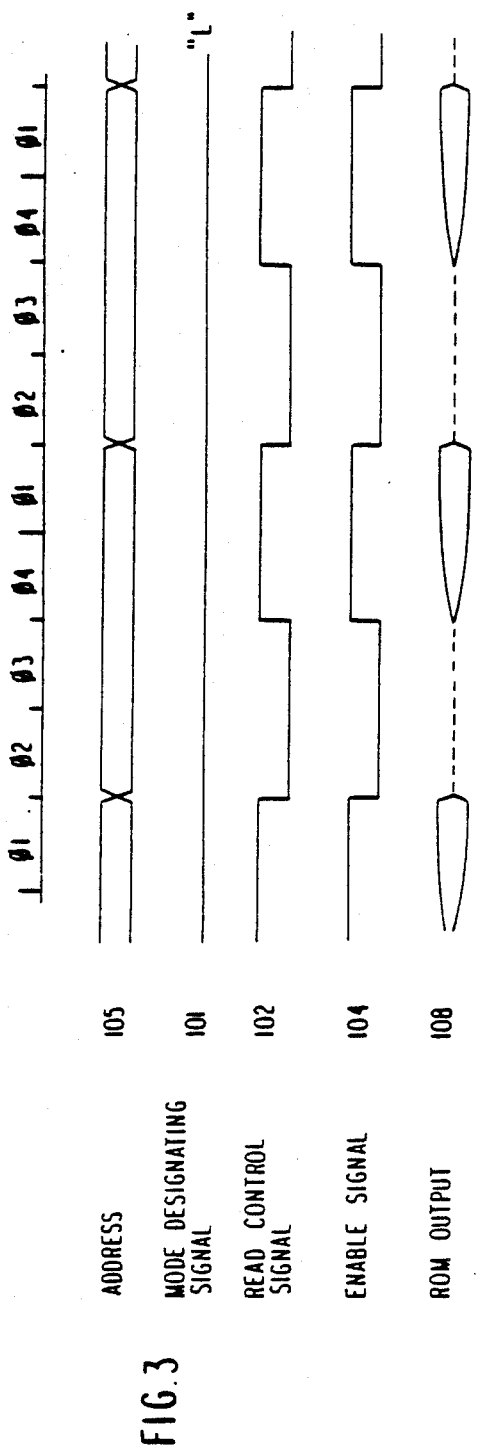
FIG. 3 illustrates a timing chart of FIG. 1 in a low-speed operation mode.

On the other hand, in the low-speed operation mode, a low-frequency clock is applied to the microcomputer, and therefore a period of each state is enlarged as shown in FIG. 3. In this mode, the mode designating signal 101 becomes "L", so that the reading control signal 102 is applied to the sense amplifier 107 as the enable signal 104. Consequently, the sense amplifier 107 is activated only the $\phi 4$ and $\phi 1$ states through the address 105 is applied to the ROM in the $\phi 2$ to $\phi 1$ states. Since the high-speed sense amplifier 107 is used, an instruction is surely read out of the ROM 106 in the short period of time ($\phi 4$ and $\phi 1$). According to this embodiment, power consumption of the sense amplifier 107 can be avoided in the $\phi 2$ and $\phi 3$ states of each cycle in the low-speed operation mode.

Figure 4:
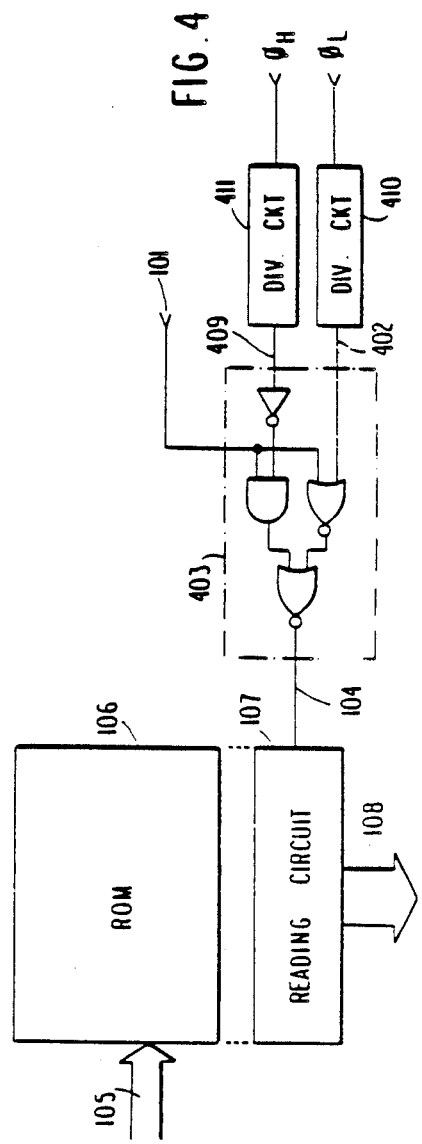
FIG. 4 illustrates a block diagram of another embodiment of the present invention.

FIG. 4 is a block diagram of another embodiment of the present invention. In this embodiment, two divider circuit 410 and 411 are provided and have a different dividing ratio with each other. The divider circuit 410 receives a low-frequency clock $\phi L$ and applies a divided clock 402 to a enable signal generating circuit 403. While, the divider circuit 411 receives a high-frequency clock $\phi H$ and applies a divided clock 409 to the generating circuit 403. The mode designating signal 101 selects either one of the divided clocks 402 and 409. When the mode designating signal 101 is "H", the divided clock 409 is selected and is applied to the sense amplifier 107 as the enable signal 104. On the other hand, when the mode designating signal 101 is "L", the divided clock 402 is applied to the sense amplifier 107 as the enable signal 104.

According to this embodiment, the high-frequency clock $\phi H$ is divided into the clock 409 with a large duty rate, while the low-frequency clock $\phi L$ is divided into the clock 402 with a short duty rate. Therefore, the sense amplifier 107 is activated with the large duty rate in the high-speed operation mode and is activated with the short duty rate in the low-speed operation mode.

Figure 5:
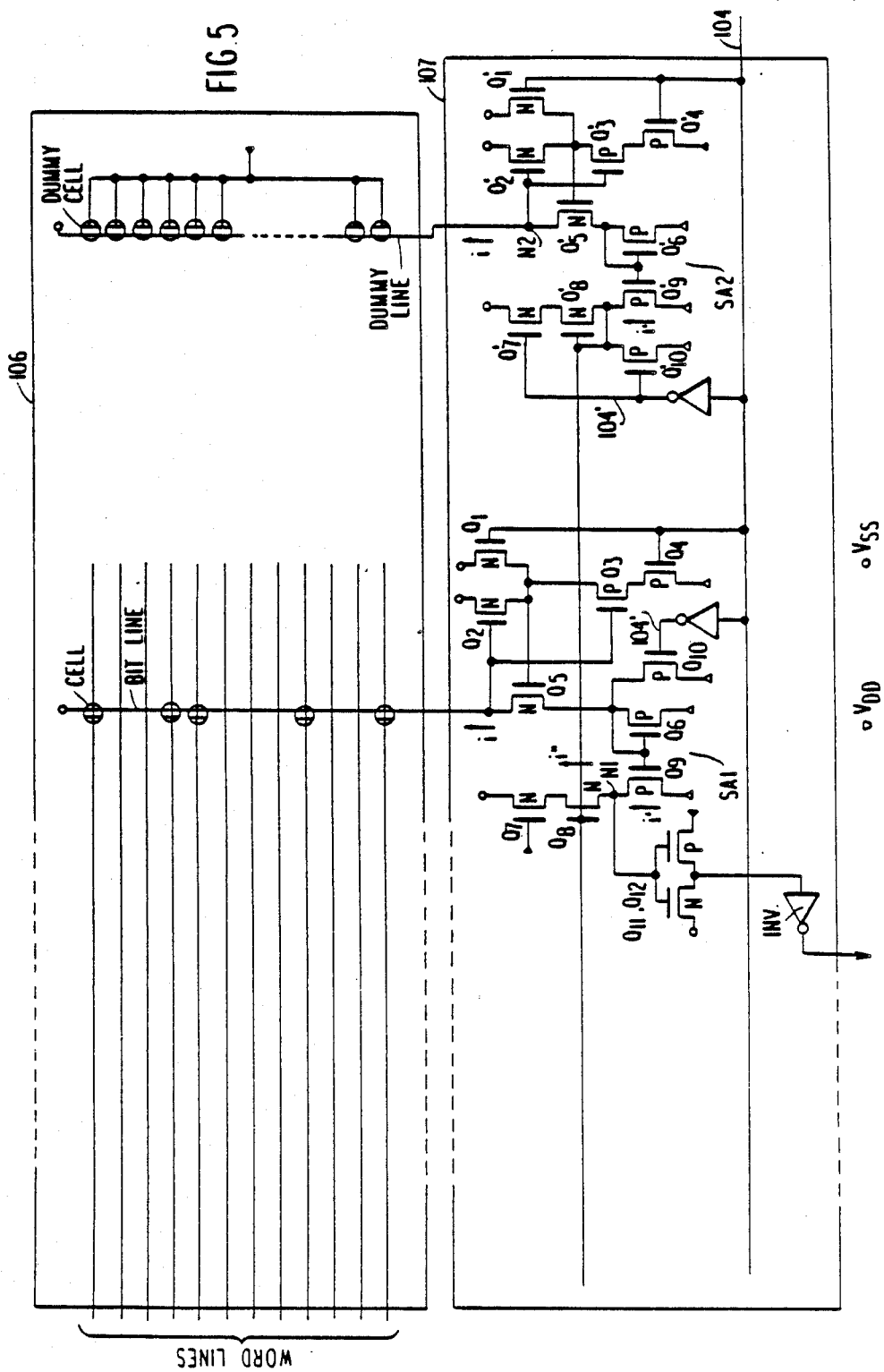
FIG. 5 illustrates a circuit diagram of a sense amplifier used in the present invention.

FIG. 5 is a circuit diagram of the ROM 106 and the sense amplifier 107 according to the preferred embodiment of the present invention. It should be noted that only one bit line and the corresponding sense amplifier is illustrated. A bit line of the ROM 106 contains cells programmed according to an instruction code. Each cell is turned on by the corresponding word signal. The ROM 106 further contains a dummy line having dummy cells equal to the word signals in number. The dummy cells are always turned on by $V_{DD}$ voltage. The sense amplifier 107 has a current mirror type sense amplifiers SA1 connected to the bit line and SA2 connected to the dummy line. These sense amplifiers SA1 and SA2 consists of a complementarily MOS circuit with a P channel MOS FET (P-FET) and an N channel MOS FET (N-FET). The sense amplifier SA1 has five N-FETs $Q_1$, $Q_2$, $Q_5$, $Q_7$ and $Q_8$ and five P-FETs $Q_3$, $Q_4$, $Q_6$, $Q_9$ and $Q_{10}$. The sense amplifier SA2 has five N-FETs $Q'_1$, $Q'_2$, $Q'_5$, $Q'_7$ and $Q'_8$ and five P-FETs $Q'_3$, $Q'_4$, $Q'_6$, $Q'_9$ and $Q'_{10}$. The enable signal 104 is applied to gates of $Q_1$, $Q'_1$, $Q_{44}$ and $Q'_4$. The inverted enable signal 104' is applied to gates of $Q'_8$, $Q_{10}$ and $Q'_{10}$. $Q_1$, $Q'_1$, $Q_4$, $Q'_4$, $Q_{10}$, $Q'_{10}$ and $Q'_7$ are provided to activate the sense amplifiers SA1 and SA2 by the enable signal 104. In this embodiment, the sense amplifier SA2 is used as a reference voltage generating circuit, and the dummy line and dummy cells are used as a dummy current source.

Since a source of N-FET $Q'_5$ and a gate of N-FET $Q'_2$ is connected to an output of the dummy line, the N-FET $Q'_2$ acts as an inverter. As a result, a potential at a node $N_2$ is equal to a threshold voltage of the N-FET $Q'_2$, so that a current i is frown to the dummy line. At this state the same current i is frown to the P-FET $Q'_6$. Since the P-FET $Q'_6$ and P-FET $Q'_9$ are a current mirror circuit, a current i' (i' = gm of $Q'_9$/gm of $Q'_6 \times$ i) is frown to the P-FET $Q'_9$ and is further frown to the N-FETs $Q'_8$ and $Q'_7$. Further, since the N-FET $Q_8$ whose gate is applied an output of the SA2 and the N-FET $Q'_8$ are a current mirror circuit, a current i" (i" = gm of $Q_8$/gm of $Q'_8 \times$ i') is frown to the N-FET $Q_8$.

At this time, when all cells of the bit line are turned on, the current i is frown to the bit line. It should be noted that gm of $Q_6$ is equal to that of $Q'_6$ and that gm of $Q_9$ is equal to that of $Q'_9$. As a result, the current i' is frown to the P-FET $Q_9$, and therefore a voltage of a node N1 becomes "H". Since the node N1 is connected to a gate of a C MOS inverter circuit $Q_{11}$ and $Q_{12}$, the N-FET $Q_{11}$ is turned on. Thus, an output "H" is derived from the ROM 106.

On the other hand, if at least one of cells on the bit line is turned off, the current i is not frown to the N-FET $Q_5$, and therefore the P-FET $Q_6$ is turned off. Consequently, the node N1 becomes "L ($V_{SS}$)", and the P-FET $Q_{12}$ is turned on. Thus, an output "L" is derived from the ROM 106.

As described above, the current mirror type sense amplifier is driven by a current mode and requires no precharge time, so that it can drive an ROM output (instruction) at high speed. However, a large amount of current is required. In the present invention, the enable signal 104 is used to reduce the power consumption of the sense amplifier.

Figure 6:
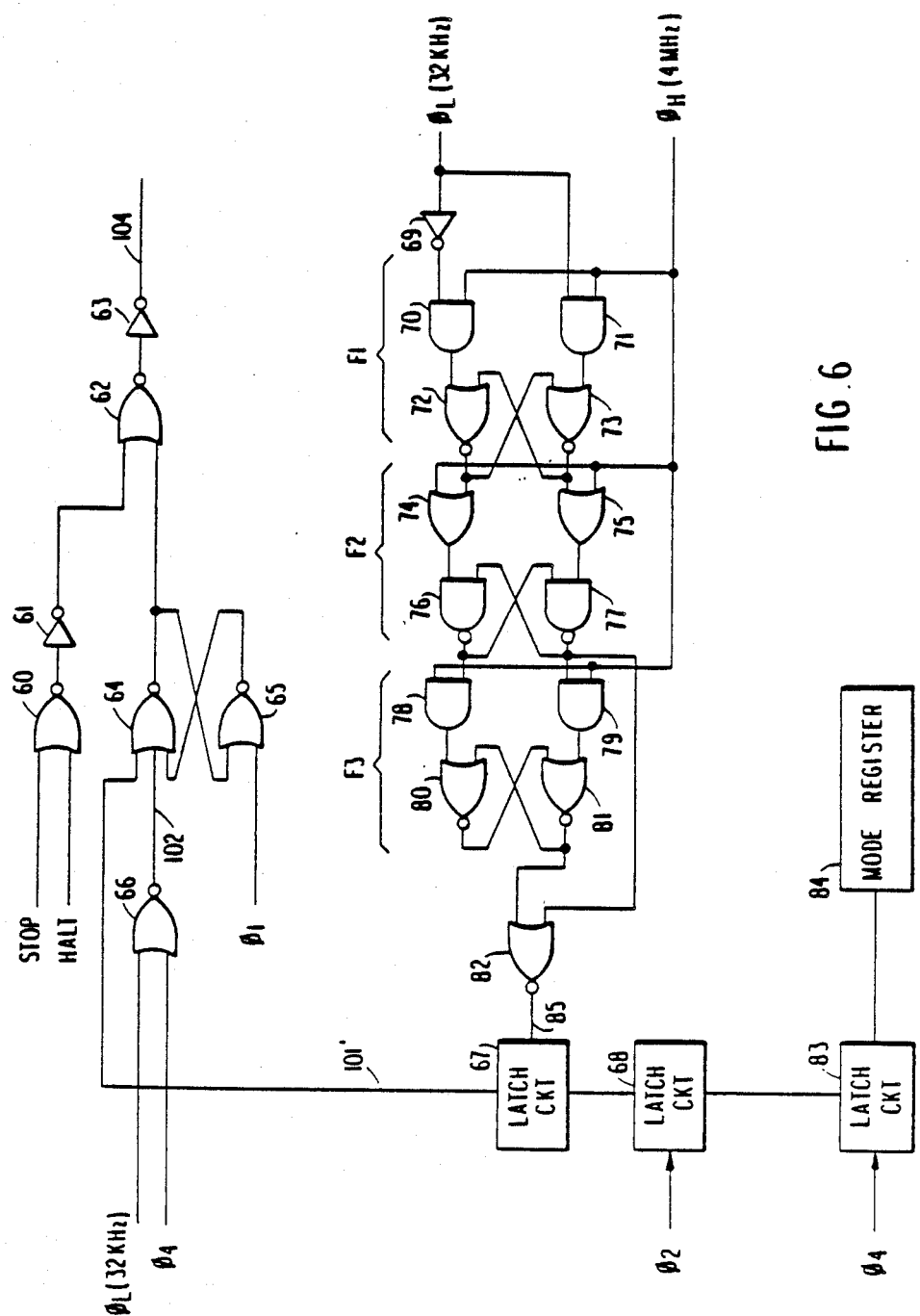
FIG. 6 illustrates a circuit diagram of an enable signal generating circuit used in the present invention.

The enable signal 104 is generated by a generating circuit shown in FIG. 6. In this embodiment, "H" is set in a mode register 84 in the high-speed operation mode, while "L" is set therein in the low-speed operation mode. The mode designating signal 101 is outputted from the mode register 84 and is transferred to an NOR gate 64 via three latch circuits 83, 68 and 67. These latch circuits are provided to control an application timing to the NOR gate 64. That is, the mode designating signal 101 is latched into the first latch circuit 83 in the $\phi 4$ state which is assigned to a write operation of the mode designating signal 101 and is latched into the second latch circuit 68 in the $\phi 2$ state. This latch circuit 68 is used to protect a noise which arrives at the write operation. Thereafter the mode designating signal 101 is latched into the third latch circuit 67 which controls a timing when the low-frequency clock $\phi L$ is changed to the high-frequency clock $\phi H$, and vice versa. The timing is determined by three cascaded flip-flops F1 to F3. First and third flip-flops F1 and F2 consists of two AND gates (70, 71 and 78, 79) and two NOR gates (72, 73 and 80, 81), respectively. The second flip-flop F2 consists of two OR gates 74, 75 and two NAND gates 76 and 77. When the low-frequency oscillator is connected to the microcomputer, the low-frequency clock $\phi L$ (32 KHz) is applied to the AND gate 71 and the clock inverted by an inverter 69 is applied to the AND gate 70. While the high-frequency clock $\phi H$ (4 MHz) is applied to the AND gates 70, 71, 78, 79 and the OR gates 74, 75 in common, when the high-frequency oscillator is connected to the microcomputer. Thus, the timing signal 85 synchronized with a falling edge of each clock is applied to the third latch circuit 67 via an NOR gate 82. The mode designating signal 101' is applied to the NOR gate 64 in synchronous with the timing signal 85. The NOR gate 64 and an NOR gate 65 are connected with each other in accordance with a flip-flop manner. This flip-flop is set by either the mode designating signal 101' or an output of an NOR gate 66. The NOR gate 66 receives the low-frequency clock $\phi L$ (32 kHz) and $\overline{\phi 4}$ signal and the read control signal 102 which is activated from a falling edge of the φL clock in the φ4 state till a rising edge of φ1 signal.

In the high-speed operation mode, the mode designating signal 101' is "H", and therefore the flip-flop is set regardless of the read control signal 102 and outputs "L" signal to an NOR gate 62. If a stop signal (STOP) and a halt signal (HALT) which are generated when a operation of the microcomputer should be stopped are not present, the enable signal 104 becomes "L" (active lebel) because the output "H" of the NOR gate 62 is inverted by an inverter 63. In response to the enable signal 104, the P-FETs $Q_4$ and $Q'_4$ are turned on, so that both the N-FETs $Q_5$ and $Q'_5$ are turned on to couple the bit line and the dummy line to the sense amplifiers SA1 and SA2, respectively. Thus, the sense amplifier 107 is always activated in the high-speed operation mode as shown in FIG. 7.

On the other hand, when the low-speed operation mode is required, the mode designating signal 101' becomes "L". As a result, the flip-flop (64 and 65) is set only when the φL and φ4 are both "L" and is reset by φ1 signal shown in FIG. 8. Therefore, the sense amplifier 107 is activated only when the φL and φ4 are both "L". In the remaining period, the enable signal 104 becomes "H", and therefore, the N-FETs $Q_1$ and $Q'_1$ are turned on while the P-FETs $Q_4$ and $Q'_4$ are turned off. Thus, the N-FETs $Q_5$ and $Q'_5$ are both turned off. Consequently, the P-FETs $Q_6$ and $Q'_6$ are discoupled from the bit line and the dummy line, respectively. At this period, no power is consumed because a current path is cut off.

Figure 7:
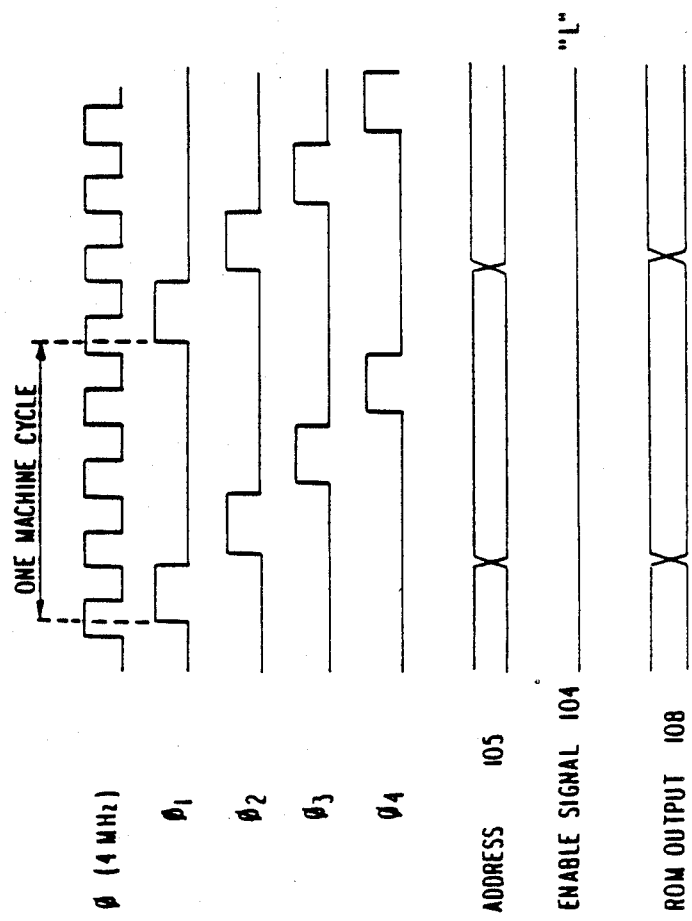
FIG. 7 illustrates a timing chart of the sense amplifier shown in FIG. 5 in a high-speed operation mode.
Figure 8:
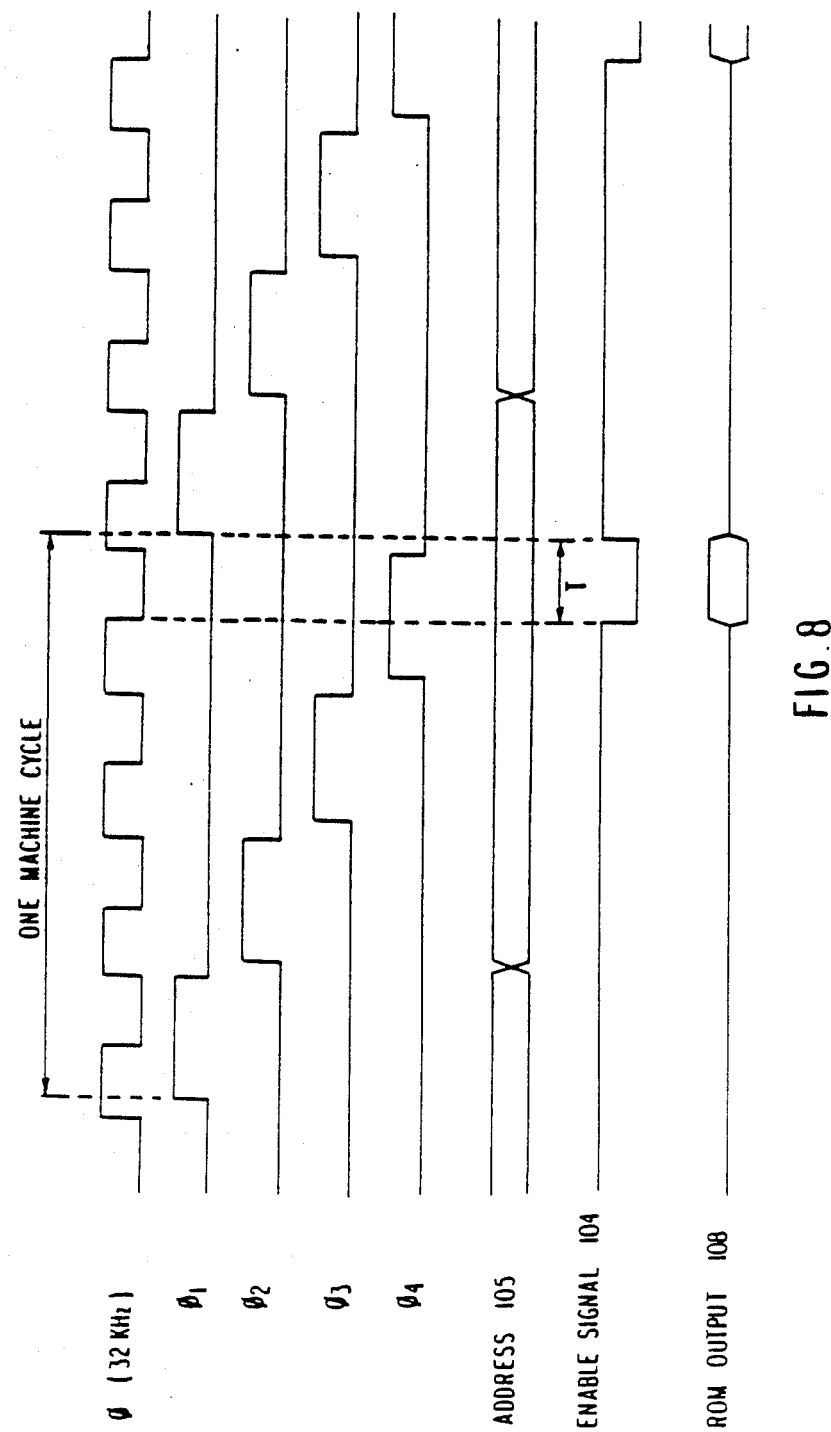
FIG. 8 illustrates a timing chart of the sense amplifier shown in FIG. 5 in a low-speed operation mode.

In FIGS. 7 and 8, each of state signals φ1 to φ4 is produced on a basis of the clock and is used to control timing of one machine (instruction) cycle. In the low-speed operation of the embodiment, an instruction is read out of the ROM in a period T and is fetched into a CPU in φ1 state. The CPU executes the fetched instruction in the φ2 to φ4 states. Further, in the φ4 state, a next instruction is read out of the ROM according to an instruction prefetch architecture.

Turning to FIG. 6, when either the stop signal or the halt signal becomes "H", the enable signal 104 becomes "H", and therefore, the sense amplifier 107 is inactivated.

What is claimed is:

1. A microcomputer comprising a memory having a plurality of bit lines and a dummy line, a first current mirror type sense amplifier having a current input terminal connected to one of said plurality of bit lines through a first switching circuit, a second current mirror type sense amplifier having a current input terminal connected to said dummy line through a second switching circuit, a signal derived from an output terminal of said second current mirror type sense amplifier being applied as a reference signal to said first current mirror type sense amplifier, an output of said memory being derived from an output terminal of said first current mirror type sense amplifier, a first means for selectively generating a first enable signal which is always activated in a high-speed operation -mode and a second enable signal which is intermittently activated in a low-speed operation mode, and a second means coupled between said first means and said first and second switching circuits for controlling said first and second switching circuits according to said first and second enable signals in such manner that said first and second switching circuits are continuously turned on in response to the activated state of said first enable signal thereby to continuously enable said first and second current mirror type sense amplifiers, and are intermittently turned on in response to the activate state of said second enable signal thereby to intermittently enable said first and second current mirror type sense amplifiers.

2. A microcomputer as claimed in claim 1, wherein each of said first and second current mirror type sense amplifiers includes a first field effect transistor having a source-drain current path coupled between the current input terminal thereof and a first power voltage terminal and a gate coupled to said current input terminal, a second field effect transistor having a source-drain current path coupled between the output terminal thereof and a gate coupled to the gate of said first field effect transistor, a second voltage terminal, and means for coupling said output terminal to said second power voltage terminal.

* * * * *